(12) United States Patent
Feng et al.

(10) Patent No.: US 8,233,364 B2
(45) Date of Patent: Jul. 31, 2012

(54) METHOD AND DEVICE FOR IDENTIFYING OPTICAL DISC

(75) Inventors: Wen-Chun Feng, Taipei (TW); Chien-Liang Yeh, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 35 days.

(21) Appl. No.: 12/875,514

(22) Filed: Sep. 3, 2010

(65) Prior Publication Data
US 2011/0058464 A1 Mar. 10, 2011

(30) Foreign Application Priority Data

Sep. 7, 2009 (TW) .............................. 98130104 A

(51) Int. Cl.
*G11B 27/36* (2006.01)
(52) U.S. Cl. .............. 369/53.22; 369/44.23; 369/124.01
(58) Field of Classification Search ................ 369/44.23, 369/53.2, 53.22, 53.37, 53.41, 124.01
See application file for complete search history.

(56) References Cited

U.S. PATENT DOCUMENTS

| | | | |
|---|---|---|---|
| 7,149,169 B2 | 12/2006 | Juan et al. | |
| 7,161,886 B2 | 1/2007 | Sun | |
| 2006/0104176 A1 | 5/2006 | Ma et al. | |
| 2006/0239160 A1* | 10/2006 | Kim et al. | 369/53.23 |
| 2009/0161511 A1* | 6/2009 | Yoshimoto | 369/53.2 |
| 2010/0014403 A1* | 1/2010 | Liu | 369/53.22 |
| 2010/0201443 A1* | 8/2010 | Kaya et al. | 330/251 |

* cited by examiner

*Primary Examiner* — Wayne Young
*Assistant Examiner* — Brenda Bernardi
(74) *Attorney, Agent, or Firm* — WPAT, PC; Justin King

(57) ABSTRACT

An optical disc identifying device includes an optical pickup head, a digital signal processor and a radio frequency amplifier. The optical pickup head has a plurality of laser diodes and a lens. During a start-up procedure, a non-blue laser diode of the optical pickup head is turned on to irradiate a loaded optical disc, thereby generating an electronic signal. The digital signal processor outputs a driving signal, thereby controlling a motor driver to move the lens in a focusing direction. The radio frequency amplifier receives the electronic signal during the movement of the lens, thereby generating a first signal. The digital signal processor includes a detecting unit for comparing the first signal with a slicing signal to generate a pulse signal, and determining whether the optical disc is a blue-ray disc or a non-blue-ray disc according to a pulse number of the pulse signal.

11 Claims, 8 Drawing Sheets

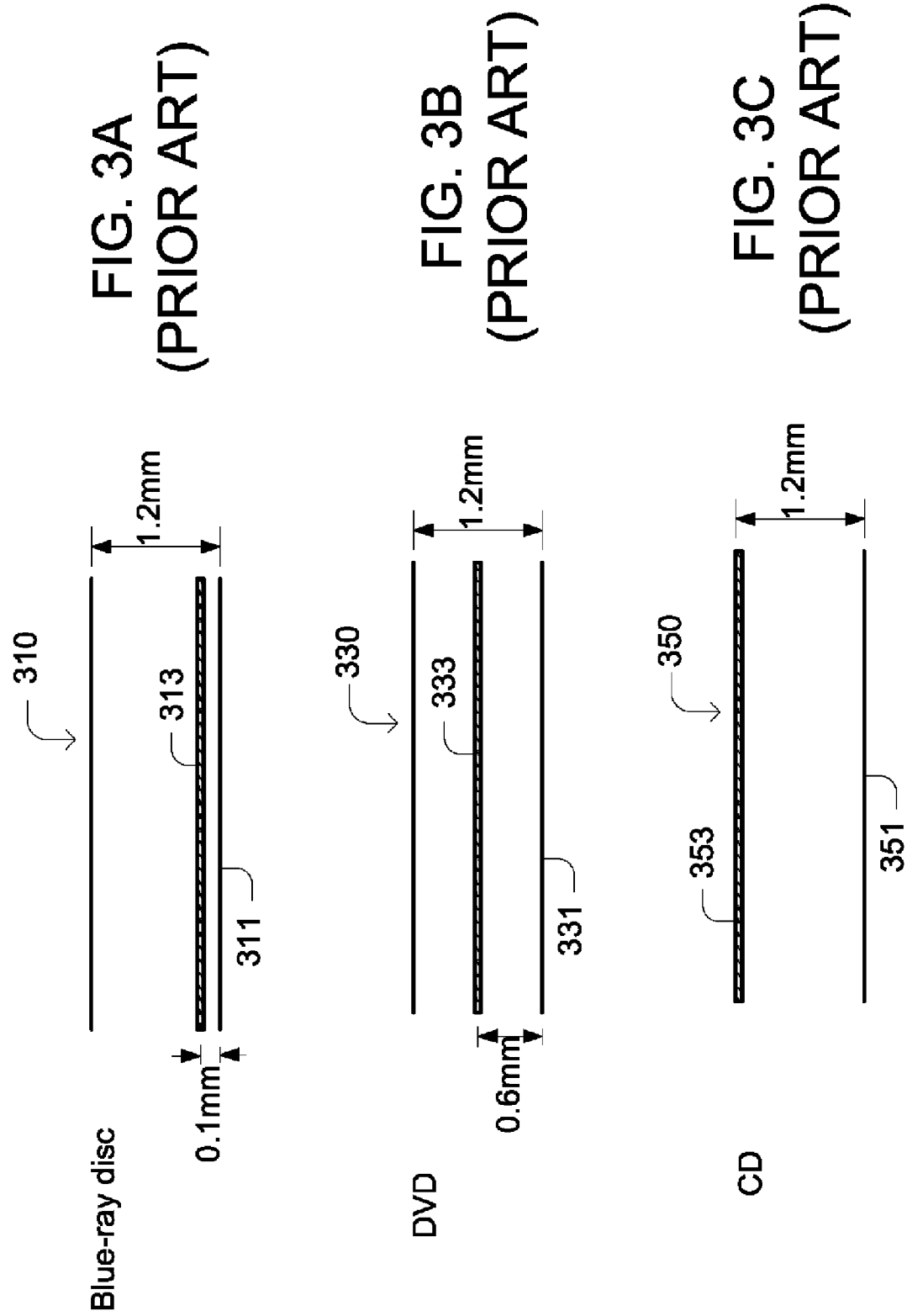

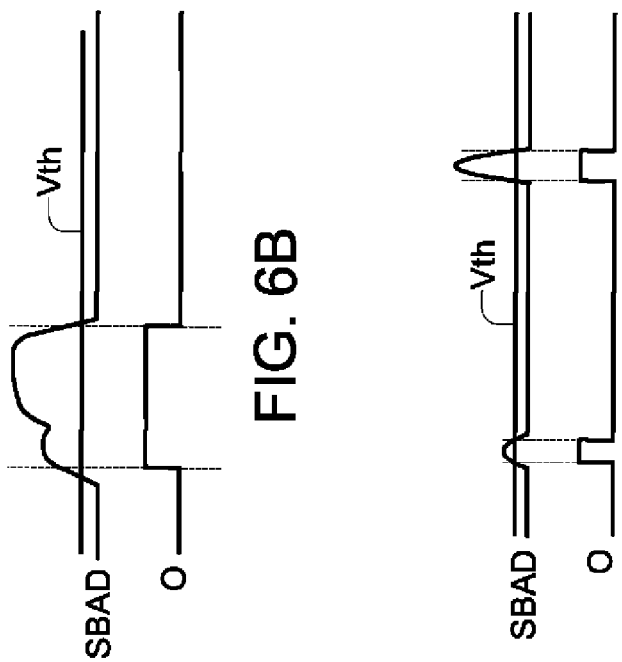
FIG. 6B
FIG. 6C
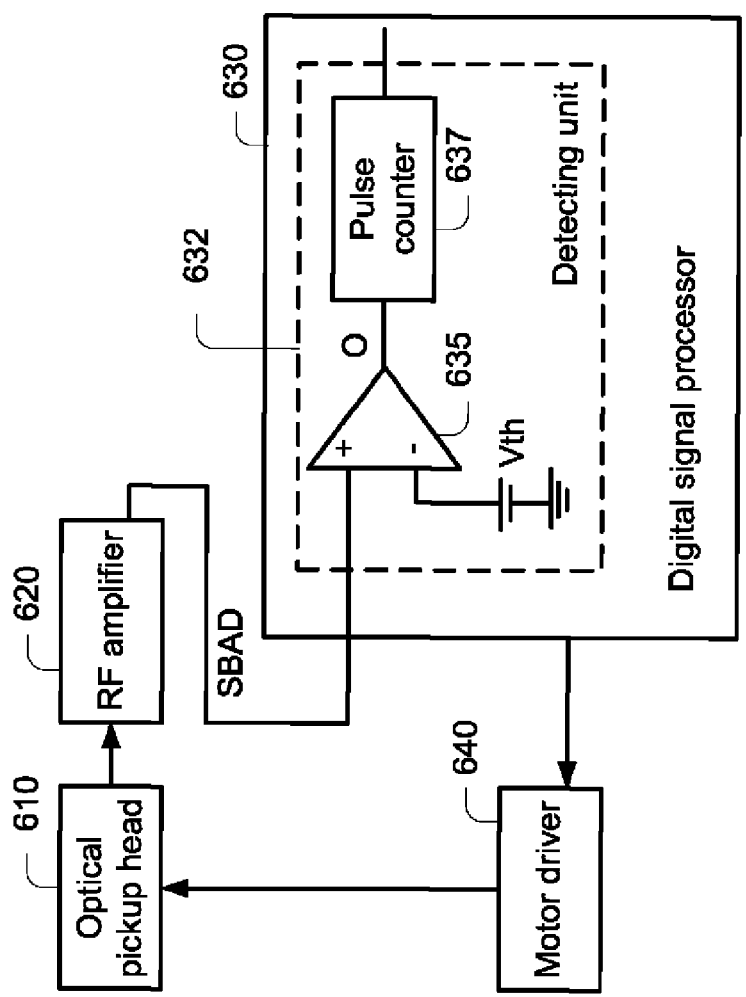
FIG. 6A

METHOD AND DEVICE FOR IDENTIFYING OPTICAL DISC

FIELD OF THE INVENTION

The present invention relates to a method and a device for identifying a type of an optical disc, and more particularly to a method and a device for determining whether the loaded optical disc is a blue-ray disc or a non-blue-ray disc.

BACKGROUND OF THE INVENTION

FIG. 1 is a schematic functional block diagram illustrating a typical optical disc drive. The optical disc drive 100 has an optical pickup head (PUH) 10. An optical disc 110 having a center hole is placed on a turn table 122. The turn table 122 is driven to rotate by a spindle motor 120 such that the optical disc 110 is rotated with the turn table 122. There are two mechanisms for moving the optical pickup head 10 in a tracking (radial) direction. The first mechanism drives long-distance movement of a sled 14 by a sled motor 130. The second mechanism drives tiny movement of a lens 12 by a tracking coil 140. In addition, the lens 12 is driven to move in the focusing direction by a focusing coil 145 to perform a focusing operation. Generally, the optical pickup head 10 has several laser diodes for reading data from corresponding types of optical discs. For example, the optical pickup head 10 includes a CD laser diode (780 nm wavelength), a DVD laser diode (650 nm wavelength) and a blue-ray laser diode (405 nm wavelength).

When a weak electronic signal is generated in response to an optical signal reflected from the optical disc 110 and received by the optical pickup head 10, the electronic signal is transmitted to a radio frequency (RF) amplifier 150. By the RF amplifier 150, the electronic signal is processed into a sub-beam addition signal SBAD, a radio frequency signal RF, a tracking error signal TE and a focusing error signal FE. These signals SBAD, RF, TE and FE are further processed by a back-end digital signal processor (DSP) 170. According to the changes of the tracking error signal TE and the focusing error signal FE outputted from the digital signal processor 170, a first motor driver 160 generates three driving signals to drive the sled motor 130, the tracking coil 140 and the focusing coil 145, thereby properly positioning the optical pickup head 10 at the desired track and desired focusing position. The driving signal generated by the first motor driver 160 for driving the tracking coil 140 to move the lens is also called as a tracking output signal TRO. Moreover, under the control of the digital signal processor 170, a second motor driver 165 drives the spindle motor 120 to rotate, thereby permitting rotation of the disc 110 at a proper rotating speed.

After an optical disc is loaded into the optical disc drive, a start-up procedure is performed to realize the type of the optical disc. The common type of optical disc includes a compact disc (CD), a digital versatile disc (DVD) or a blue-ray disc. After the type of the optical disc is realized by the optical disc drive, associated controlling parameters are acquired to access the optical disc.

For example, the conventional optical disc drive may identify the type of the optical disc according to the distance between a surface layer and a data layer of the optical disc. FIGS. 2A and 2B are schematic diagrams illustrating associated detected signals when the loaded optical disc is a digital versatile disc and a compact disc, respectively.

As shown in FIG. 2A, the distance between the surface layer and the data layer of the digital versatile disc 200 is 0.6 mm. In a case that the focusing coil of the optical disc drive is controlled to have the lens 202 move toward the digital versatile disc 200, the focusing point of the light beam successively crosses the surface layer and the data layer. When the focusing point crosses the surface layer, the amplitude of the radio frequency signal RF has a smaller peak value. When the focusing point crosses the data layer, the amplitude of the radio frequency signal RF has a larger peak value. In addition, when the focusing point crosses the surface layer, the S curve of the focusing error signal FE has a larger peak-to-peak value. Whereas, when the focusing point crosses the data layer, the S curve of the focusing error signal FE has a smaller peak-to-peak value. Like the radio frequency signal RF, the timing waveform diagram of the sub-beam addition signal SBAD also has two peak values.

As shown in FIG. 2B, the distance between the surface layer and the data layer of the compact disc 200 is 1.2 mm. In a case that the focusing coil of the optical disc drive is controlled to have the lens 202 move toward the compact disc 250, the focusing point successively crosses the surface layer and the data layer. Similarly, the radio frequency signal RF has two different peak values when the focusing point crosses the surface layer and the data layer. In addition, the S curve of the focusing error signal FE has two different peak-to-peak values.

Please refer to FIGS. 2A and 2B again. Assuming that the speed of moving the lens 202 is constant, the distance between the peak values of the radio frequency signal RF for the compact disc is greater than the distance between the peak values of the radio frequency signal RF for the digital versatile disc. Similarly, the distance between the S curves of the focusing error signal FE for the compact disc is greater than the distance between the S curves of the focusing error signal FE for the digital versatile disc. According to these characteristics, the loaded optical disc is determined as a compact disc or a digital versatile disc.

However, if the speed of moving the lens is instable, the possibility of erroneously identifying the compact disc and the digital versatile disc will be increased. For enhancing the identification success rate, the method described in U.S. Pat. Nos. 7,149,169 or 7,161,886 further includes an identifying step. In addition, the loaded optical disc is determined as a compact disc or a digital versatile disc according to the sub-beam addition signal SBAD.

In U.S. Pat. No. 7,161,886, different laser diodes are turned on when the lens is moved in different directions, and the loaded optical disc is determined as a compact disc or a digital versatile disc according to the relationship between the radio frequency signal RF and the focusing error signal FE.

The above methods are used for determining whether the loaded optical disc is a compact disc or a digital versatile disc. Generally, the compact disc and the digital versatile disc are classified as non-blue-ray discs.

As the new generation blue-ray discs are introduced to the market, it is important to immediately determine whether the loaded optical disc is a compact disc, a digital versatile disc or a blue-ray disc during the start-up procedure.

FIGS. 3A-3C are schematic diagrams illustrating three types of optical discs. FIGS. 3D-3E are schematic diagrams illustrating the method for determining whether the loaded optical disc is a blue-ray disc or a non-blue-ray disc according to the prior art. This method is described in US Patent Publication No. US 2006/0104176. This method may identify the type of the loaded optical disc according to a working distance of the lens and a distance between a data layer and a surface layer of the optical disc. As shown in FIG. 3A, the blue-ray disc 310 has a thickness of 1.2 mm. A distance between the data layer 313 and the surface layer 311 of the blue-ray disc 310 is 0.1 mm. As shown in FIG. 3B, the digital versatile disc 330 has a thickness of 1.2 mm. A distance between the data layer 333 and the surface layer 331 of the digital versatile disc 330 is 0.6 mm. As shown in FIG. 3C, the compact disc 350 has a thickness of 1.2 mm. A distance between the data layer 353 and the surface layer 351 of the compact disc 350 is 1.2 mm.

As known, since the blue light source of the optical pickup head works with a high numerical aperture (NA) lens and generates short-wavelength light beams, the lens has a short focal length. In this circumstance, the working distance of the blue-ray disc is smaller than the distance between the surface layer and the data layer of the digital versatile disc or the compact disc (i.e. smaller than 0.6 mm). Generally, the working distance is an allowed moving distance of the lens of a blue-light optical pickup head toward the optical disc.

As shown in FIG. 3D, when the blue laser diode radiates light onto the blue-ray disc 310 and the focusing point is moved within the working distance, two reflection signals are generated because the focusing point crosses the surface layer 311 and the data layer 313 of the blue-ray disc 310, respectively. The first reflection signal 381 is obtained from the reflection of the surface layer 311 of the blue-ray disc 310. The second reflection signal 382 is obtained from the reflection of the data layer 313 of the blue-ray disc 310.

On the other hand, as shown in FIG. 3E, when the blue laser diode radiates light onto the digital versatile disc 330 and the focusing point is moved within the working distance, only a reflection signal 383 is generated. Since the distance between the data layer 333 and the surface layer 331 of the digital versatile disc 330 is 0.6 mm, the reflection signal 383 is obtained from the reflection of the surface layer 331 of the digital versatile disc 330. In other words, since the focusing point of the blue laser light fails to reach the data layer 333 of the digital versatile disc 330, no other reflection signal is generated. Similarly, only one reflection signal is detected when a compact disc is loaded.

As such, the loaded optical disc is determined as a non-blue-ray disc (e.g. a compact disc, a digital versatile disc) or a blue-ray disc according to the reflection signal number. If two reflection signals are generated, the optical disc is determined as a blue-ray disc. Whereas, if only one reflection signal is generated, the optical disc is determined as a non-blue-ray disc (e.g. a compact disc, a digital versatile disc).

As know, the blue laser diode is very expensive. Since the blue laser diode needs to be turned on to identify the type of the optical disc once the optical disc is loaded into the optical disc drive, the use life of the blue laser diode will be shortened. Moreover, since the working distance of the blue laser light is very short, the lens and the optical disc are possibly abraded by each other when the lens is moved to identify the type of the optical disc.

SUMMARY OF THE INVENTION

The present invention provides a device and a method for identifying a type of a loaded optical disc. According to the present invention, a cost-effective non-blue laser diode is used to determine whether the loaded optical disc is a blue-ray disc or a non-blue-ray disc. As a consequence, the use life of the blue laser diode will be extended, and the possibility of abrading the lens and the disc surface will be minimized.

In accordance with an aspect of the present invention, there is provided an optical disc identifying device. The optical disc identifying device includes an optical pickup head, a digital signal processor and a radio frequency amplifier. The optical pickup head has a plurality of laser diodes and a lens. During a start-up procedure, a non-blue laser diode of the plurality of laser diodes of the optical pickup head is turned on to irradiate an optical disc, thereby generating an electronic signal. The digital signal processor is used for outputting a driving signal, thereby controlling a motor driver to move the lens in a focusing direction. The radio frequency amplifier is used for receiving the electronic signal during the movement of the lens, thereby generating a first signal. The digital signal processor includes a detecting unit for comparing the first signal with a slicing signal to generate a pulse signal, and determining whether the optical disc is a blue-ray disc or a non-blue-ray disc according to a pulse number of the pulse signal.

In accordance with an aspect of the present invention, there is provided an optical disc identifying method for identifying a type of an optical disc loaded into an optical disc drive during a start-up procedure. The optical disc identifying method includes steps of turning on a non-blue laser diode of an optical pickup head, controlling a lens of the optical pickup head to move in a focusing direction to generate a first signal, and comparing the first signal with a slicing signal to obtain a pulse number. If the pulse number is equal to 1, the optical disc is determined as a blue-ray disc. If the pulse number is not equal to 1, the optical disc is determined as a non-blue-ray disc.

BRIEF DESCRIPTION OF THE DRAWINGS

The above contents of the present invention will become more readily apparent to those ordinarily skilled in the art after reviewing the following detailed description and accompanying drawings, in which:

FIGS. 3A-3C are schematic diagrams illustrating three types of optical discs;

FIG. 6A is a schematic functional block diagram illustrating an optical disc identifying device according to a first embodiment of the present invention;

FIG. 6B is a schematic diagram illustrating associated detected signals when a blue-ray disc is loaded according to the first embodiment of the present invention;

FIG. 6C is a schematic diagram illustrating associated detected signals when a non-blue-ray disc is loaded according to the first embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In accordance with the present invention, after the optical disc is loaded into an optical disc drive, the CD laser diode or the DVD laser diode of the optical disc drive is turned on. According to the sub-beam addition signal SBAD, the loaded optical disc is determined as a blue-ray disc or a non-blue-ray disc. Moreover, the present invention provides a method for determining whether the loaded optical disc is a blue-ray disc or a non-blue-ray disc according to a spherical aberration effect.

Figure 4:
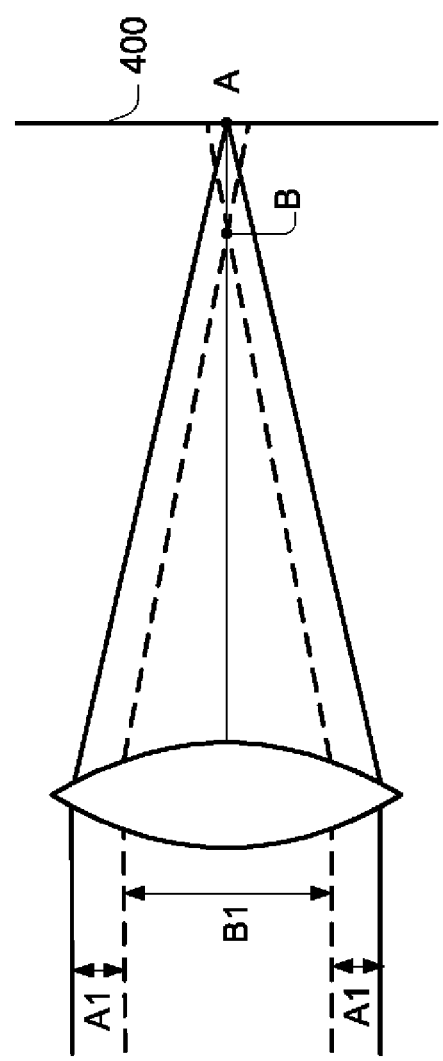
FIG. 4 is a schematic diagram illustrating a spherical aberration effect observed in a lens.

FIG. 4 is a schematic diagram illustrating a spherical aberration effect observed in a lens. In a case that the spherical aberration effect occurs, the light beams passing through the outer region A1 of the lens are focused at the point A on a plane 400, but the light beams passing through the inner region B1 are focused at the point B in front of the plane 400. That is, since the focusing points of the light beams passing through the inner region and the outer region do not overlap, the spherical aberration effect occurs. In practice, many focusing points may simultaneously exist between the point A and the point B. Once the spherical aberration effect occurs, it may be considered that many focusing points successively cross the plane 400 when the lens is moved toward the plane 400.

Generally, a serious spherical aberration effect occurs when the DVD laser diode or the CD laser diode irradiates the blue-ray disc, but the serious spherical aberration effect does not occur when the DVD laser diode or the CD laser diode irradiates the non-blue-ray disc. According to these characteristics, the loaded optical disc is determined as a blue-ray disc or a non-blue-ray disc.

Figure 1:
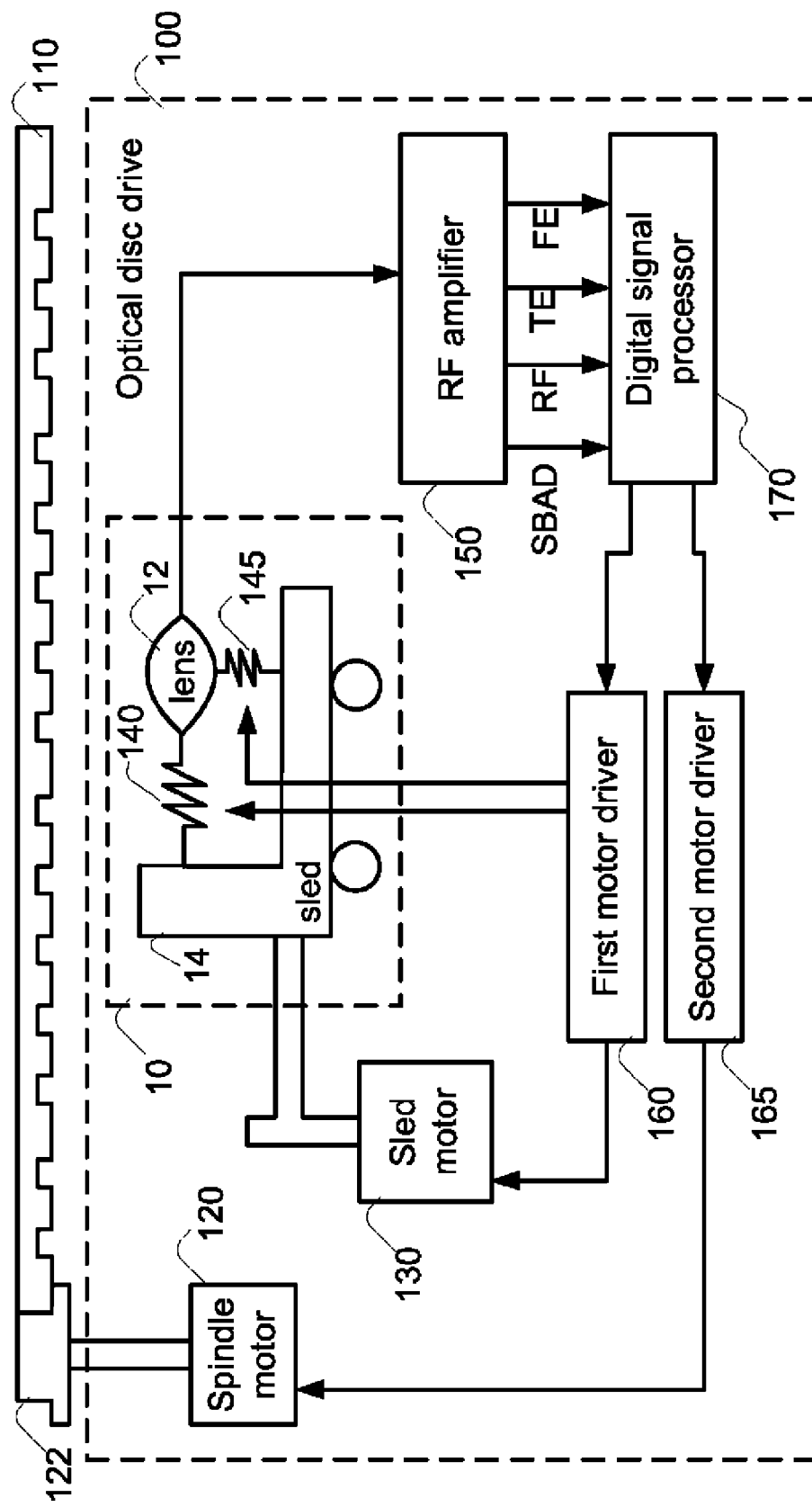
FIG. 1 is a schematic functional block diagram illustrating a typical optical disc drive.
Figure 2B:
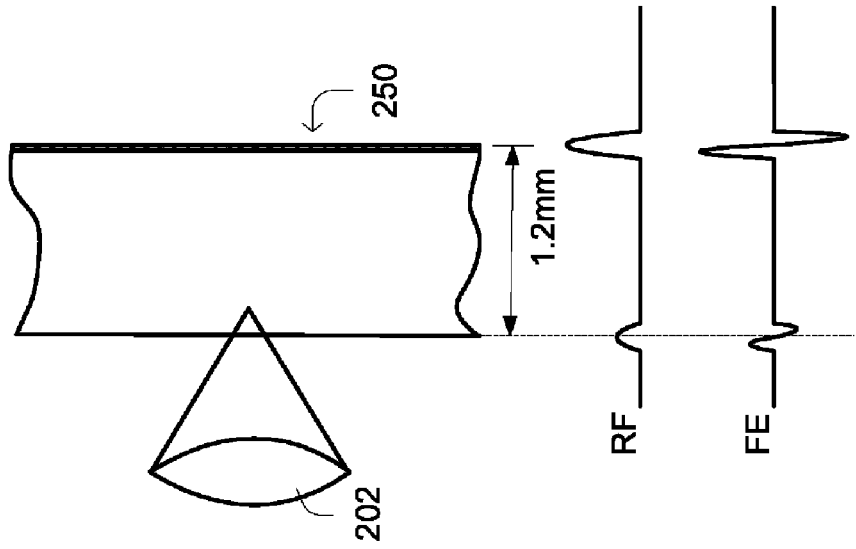
FIGS. 2A and 2B are schematic diagrams illustrating associated detected signals obtained when the loaded optical disc is a digital versatile disc and a compact disc, respectively.
Figure 2A:
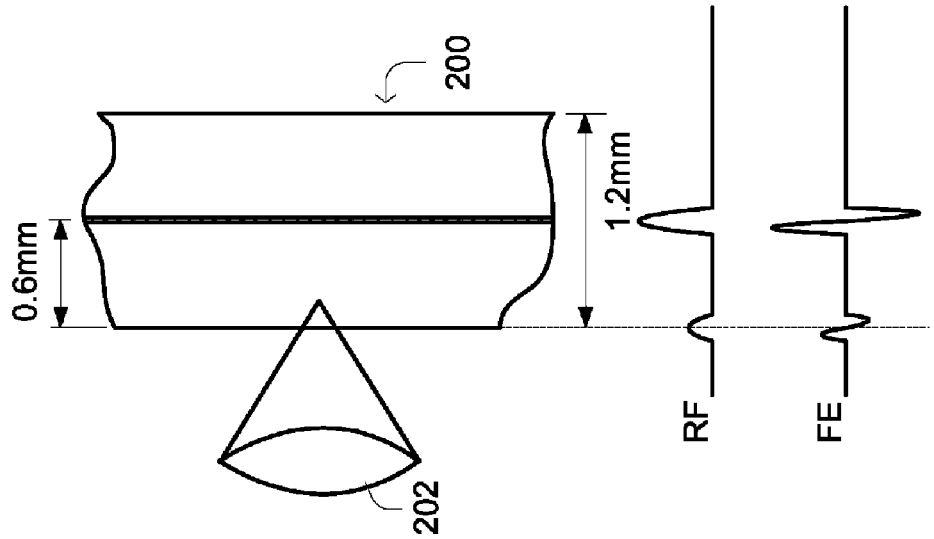
Figure 3E:
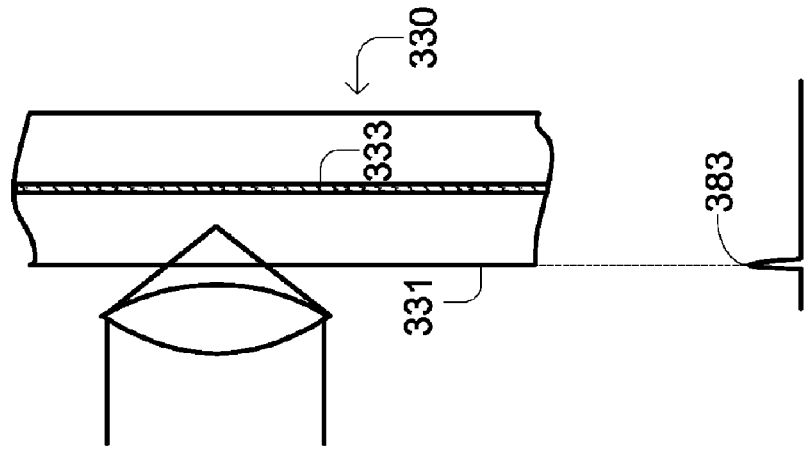
FIGS. 3D and 3E are schematic diagrams illustrating the method for determining whether the loaded optical disc is a blue-ray disc or a non-blue-ray disc according to the prior art.
Figure 3D:
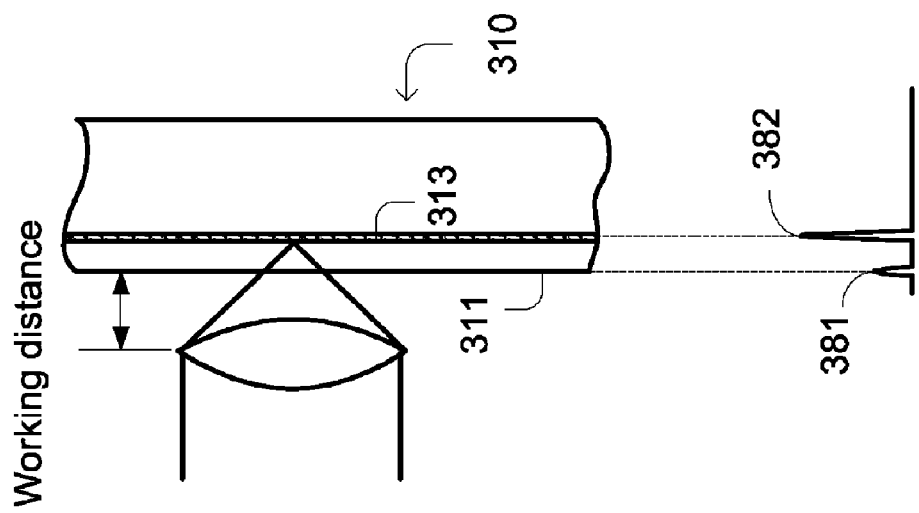
Figure 5:
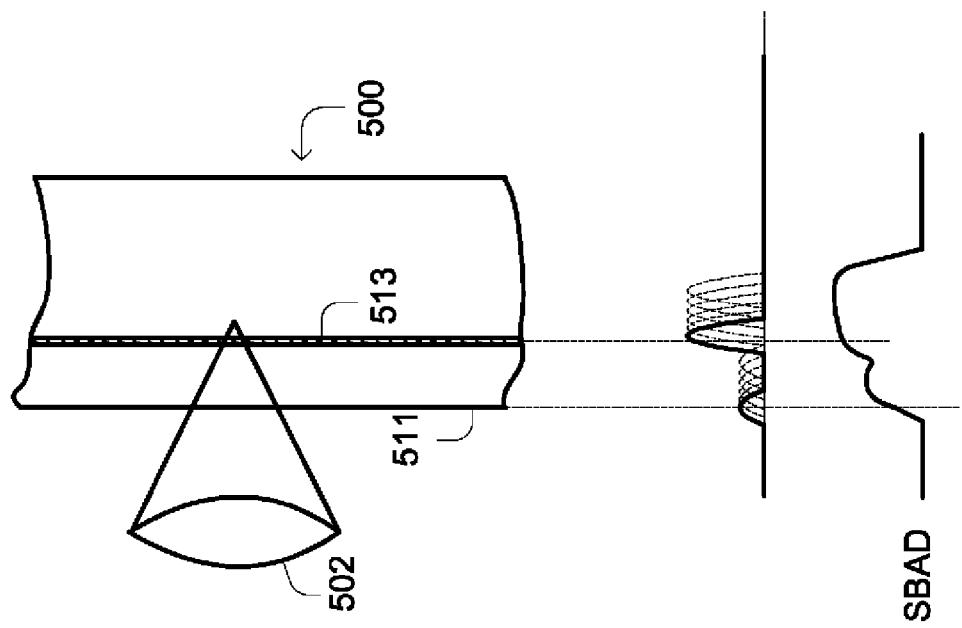
FIG. 5 is a schematic diagram illustrating associated signals obtained when a non-blue laser diode irradiates a blue-ray disc.

FIG. 5 is a schematic diagram illustrating associated detected signals when a non-blue laser diode irradiates a blue-ray disc. When a non-blue laser diode (a DVD laser diode or a CD laser diode) irradiates the surface layer 511 and the data layer 513 of the blue-ray disc 500, it may be considered that many focusing points successively cross the surface layer 511 and the data layer 513 of the blue-ray disc 500 because the spherical aberration effect is very serious.

When one focusing point crosses the surface layer 511 and the data layer 513 of the blue-ray disc 500, two peak values are obtained. As such, when many focusing points successively cross the surface layer 511 and the data layer 513 of the blue-ray disc 500, many peaks superpose. The waveform of the sub-beam addition signal SBAD (or a radio frequency signal RF) is shown in FIG. 5.

FIG. 6A is a schematic functional block diagram illustrating an optical disc identifying device according to a first embodiment of the present invention. As shown in FIG. 6A, the optical disc identifying device includes an optical pickup head 610, a radio frequency (RF) amplifier 620, a digital signal processor 630 and a motor driver 640. The digital signal processor 630 includes a detecting unit 632 for determining whether the loaded optical disc is a blue-ray disc or a non-blue-ray disc. In addition, the detecting unit 632 includes a comparator 635 and a pulse counter 637.

After an optical disc is loaded into the optical disc drive, a start-up procedure is performed, and a non-blue laser diode of the optical pickup head 610 is turned on. Then, the digital signal processor 630 controls the motor driver 640 to move the lens of the optical pickup head 610 in the focusing direction. As such, an electronic signal is transmitted from the optical pickup head 610 to the RF amplifier 620. By the RF amplifier 650, the electronic signal is processed into a sub-beam addition signal SBAD.

Moreover, the sub-beam addition signal SBAD may be received by the detecting unit 632 of the digital signal processor 630. According to the sub-beam addition signal SBAD, the detecting unit 632 will determine whether the loaded optical disc is a blue-ray disc or a non-blue-ray disc. The sub-beam addition signal SBAD is received by the positive input terminal of the comparator 635 of the detecting unit 632. In addition, a slicing signal Vth is received by a negative input terminal of the comparator 635. The pulse counter 637 is connected to an output terminal O of the comparator 635.

FIG. 6B is a schematic diagram illustrating associated detected signals when a blue-ray disc is loaded. Clearly, when the non-blue laser diode irradiates a blue-ray disc, by comparing the sub-beam addition signal SBAD with the slicing signal Vth during the movement of the lens, a single pulse is outputted from the comparator 635. As a consequence, the count value outputted from the pulse counter 637 is "1". FIG. 6C is a schematic diagram illustrating associated detected signals when a non-blue-ray disc is loaded. Clearly, when the non-blue laser diode irradiates a non-blue-ray disc, by comparing the sub-beam addition signal SBAD with the slicing signal Vth during the movement of the lens, two pulses are outputted from the comparator 635. As a consequence, the count value outputted from the pulse counter 637 is "2". In other words, according to the count value outputted from the pulse counter 637 of the detecting unit 632, the digital signal processor 630 may determine whether the loaded optical disc is a blue-ray disc or a non-blue-ray disc.

Since the waveform of the radio frequency signal RF is similar to that of the sub-beam addition signal SBAD, the digital signal processor 630 may determine whether the loaded optical disc is a blue-ray disc or a non-blue-ray disc according to the radio frequency signal RF.

Figure 7:
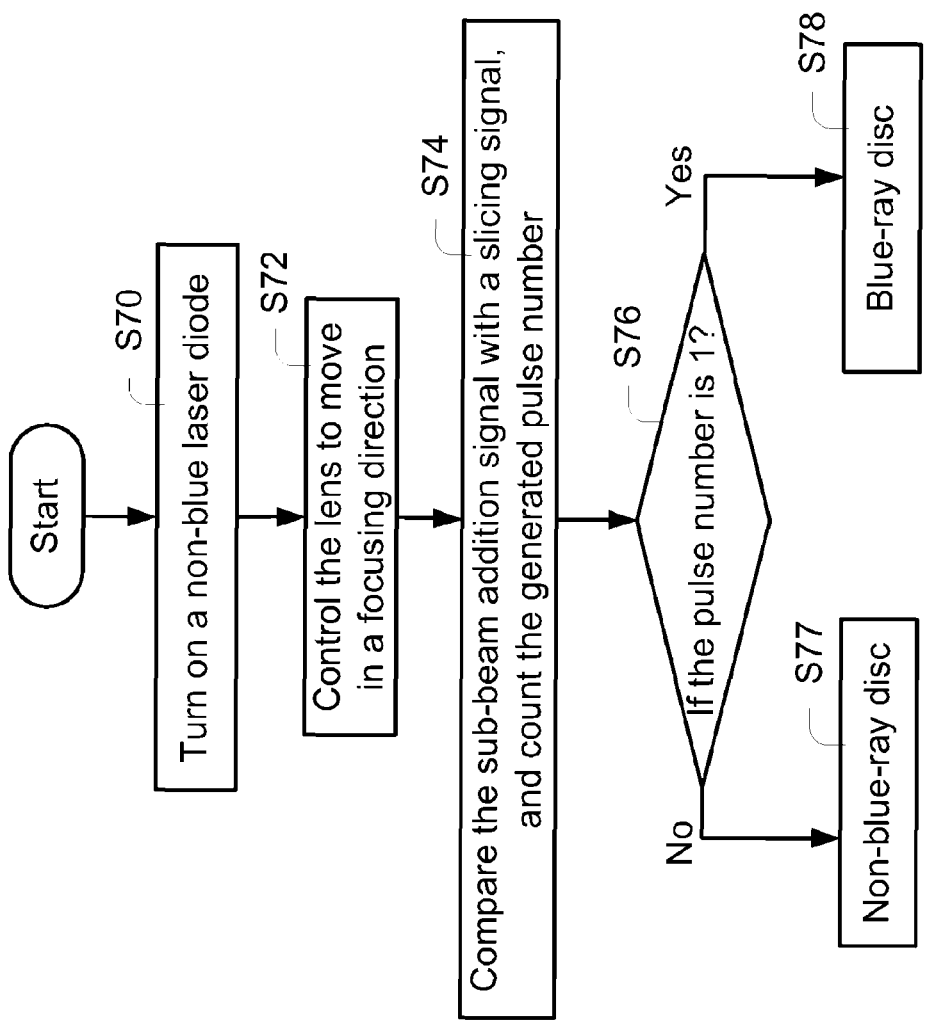
FIG. 7 is a flowchart illustrating an optical disc identifying method according to the present invention.

FIG. 7 is a flowchart illustrating an optical disc identifying method according to the present invention. After an optical disc is loaded into the optical disc drive, a start-up procedure is performed, and a non-blue laser diode of the optical pickup head is turned on (Step S70). Next, the lens is controlled to move in a focusing direction (Step S72). When the lens is moved in the focusing direction, the lens is moved toward or away from the optical disc.

During the movement of the lens, a sub-beam addition signal SBAD is generated. By comparing the sub-beam addition signal SBAD with a slicing signal, a pulse signal is generated and the pulse number is counted (Step S74). If the pulse number is 1 (Step S76), the loaded optical disc is determined as a blue-ray disc (Step S78). Whereas, if the pulse number is not 1 (Step S76), the loaded optical disc is determined as a non-blue-ray disc (Step S77).

In a case that the optical disc is determined as a non-blue-ray disc, the optical disc drive may further determine whether the non-blue-ray disc is a digital versatile disc or a compact disc. The methods for determining whether the non-blue-ray disc is a digital versatile disc or a compact disc are known in the art, and are not redundantly described herein.

Figure 8B:
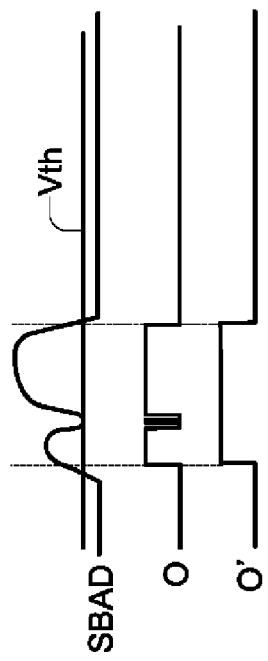
FIG. 8B is a schematic diagram illustrating associated detected signals when a blue-ray disc is loaded according to the second embodiment of the present invention.
Figure 8C:
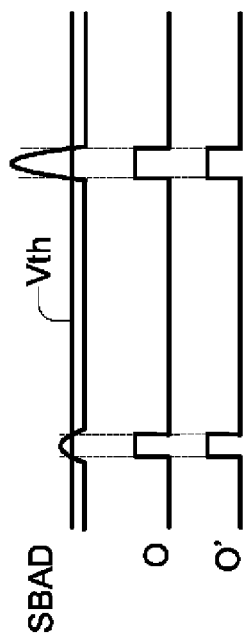
FIG. 8C is a schematic diagram illustrating associated detected signals when a non-blue-ray disc is loaded according to the second embodiment of the present invention.
Figure 8A:
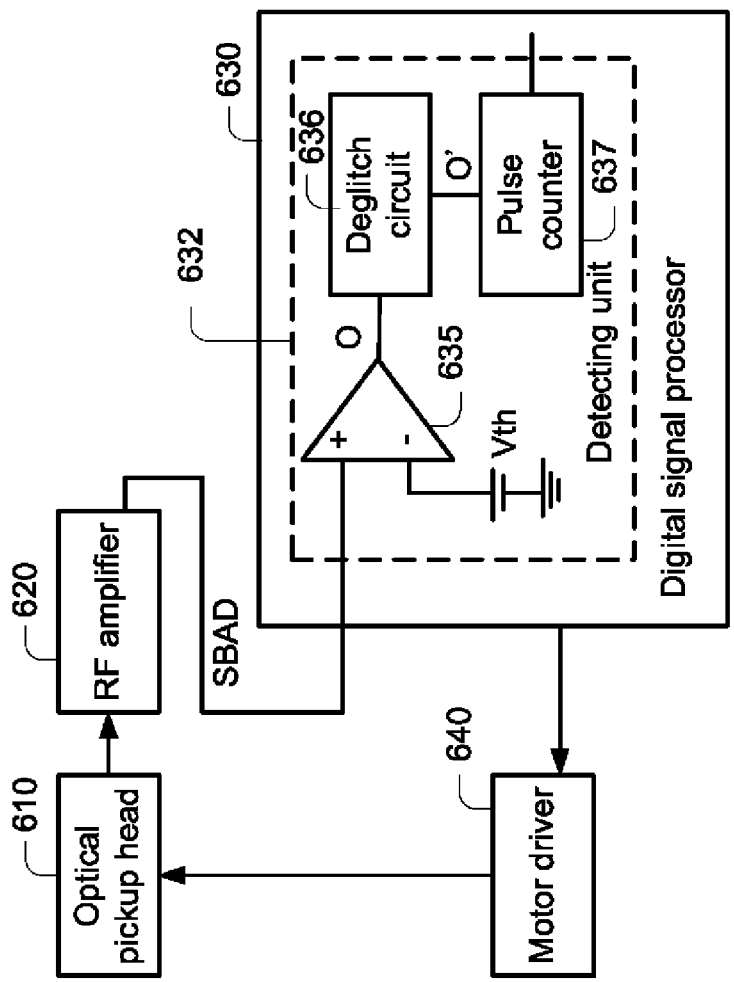
FIG. 8A is a schematic functional block diagram illustrating an optical disc identifying device according to a second embodiment of the present invention.

FIG. 8A is a schematic functional block diagram illustrating an optical disc identifying device according to a second embodiment of the present invention. It is found that the disturbance of the sub-beam addition signal SBAD may cause a glitch phenomenon at the output terminal O of the comparator 635. For eliminating the glitch phenomenon, the optical disc identifying device of this embodiment further includes a deglitch circuit 636 (see FIG. 8A). The deglitch circuit 636 is arranged between the output terminal O of the comparator 635 and a pulse counter 637. The use of the deglitch circuit 636 may eliminate the glitch phenomenon at the output terminal O of the comparator 635.

FIG. 8B is a schematic diagram illustrating associated detected signals when a blue-ray disc is loaded. When the non-blue laser diode irradiates a blue-ray disc, by comparing the sub-beam addition signal SBAD with the slicing signal Vth during the movement of the lens, a glitch phenomenon occurs at the output terminal O of the comparator 635. Since the glitch phenomenon is eliminated by the deglitch circuit 636, a single pulse is outputted from the output terminal O' of the deglitch circuit 636. As a consequence, the count value outputted from the pulse counter 637 is "1". FIG. 8C is a schematic diagram illustrating associated detected signals when a non-blue-ray disc is loaded. When the non-blue laser diode irradiates a non-blue-ray disc, by comparing the sub-beam addition signal SBAD with the slicing signal Vth during the movement of the lens, two pulses are outputted from the comparator 635. Since no glitch phenomenon occurs at the output terminal O of the comparator 635, the deglitch circuit 636 is disabled in this situation. As a consequence, the count value outputted from the pulse counter 637 is "2". In other words, according to the count value outputted from the pulse counter 637 of the detecting unit 632, the digital signal processor 630 may determine whether the loaded optical disc is a blue-ray disc or a non-blue-ray disc.

From the above description, the present invention is capable of determining whether the loaded optical disc is a blue-ray disc or a non-blue-ray disc without using the blue laser diode. Since a serious spherical aberration effect generated when a DVD laser diode or a CD laser diode irradiates a blue-ray disc, these characteristics may be utilized to identify the type of the loaded optical disc. As a consequence, the use life of the blue laser diode will be extended, and the possibility of abrading the lens and the disc surface will be minimized.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical disc identifying device, comprising:
an optical pickup head having a plurality of laser diodes and a lens, wherein during a start-up procedure, a non-blue laser diode of the plurality of laser diodes of the optical pickup head is turned on to irradiate an optical disc, thereby generating an electronic signal;
a digital signal processor for outputting a driving signal, thereby controlling a motor driver to move the lens in a focusing direction; and
a radio frequency amplifier for receiving the electronic signal during the movement of the lens, thereby generating a first signal,
wherein the digital signal processor includes a detecting unit for comparing the first signal with a slicing signal to generate a pulse signal, and determining whether the optical disc is a blue-ray disc or a non-blue-ray disc according to a pulse number of the pulse signal;
wherein if the pulse number is equal to 1, the optical disc is determined as the blue-ray disc, and if the pulse number is not equal to 1, the optical disc is determined as the non-blue-ray disc.

2. The optical disc identifying device according to claim 1 wherein the first signal is a sub-beam addition signal or a radio frequency signal.

3. The optical disc identifying device according to claim 1 wherein the non-blue laser diode is a CD laser diode or a DVD laser diode, and the non-blue-ray disc is a compact disc or a digital versatile disc.

4. The optical disc identifying device according to claim 1 wherein when the lens is moved in the focusing direction, the lens is moved toward or away from the optical disc.

5. The optical disc identifying device according to claim 1 wherein the detecting unit comprises:
a comparator having a positive input terminal for receiving the first signal and a negative input terminal for receiving the slicing signal; and
a pulse counter connected to an output terminal of the comparator for counting the pulse number of the pulse signal.

6. The optical disc identifying device according to claim 1 wherein the detecting unit comprises:
a comparator having a positive input terminal for receiving the first signal and a negative input terminal for receiving the slicing signal;
a deglitch circuit connected to an output terminal of the comparator for eliminating a glitch phenomenon at the output terminal of the comparator; and
a pulse counter connected to an output terminal of the deglitch circuit for counting the pulse number of the pulse signal.

7. An optical disc identifying method for identifying a type of an optical disc loaded into an optical disc drive during a start-up procedure, the optical disc identifying method comprising steps of:
turning on a non-blue laser diode of an optical pickup head;
controlling a lens of the optical pickup head to move in a focusing direction, thereby generating a first signal; and
comparing the first signal with a slicing signal, thereby obtaining a pulse number, wherein if the pulse number is equal to 1, the optical disc is determined as a blue-ray disc, and if the pulse number is not equal to 1, the optical disc is determined as a non-blue-ray disc.

8. The optical disc identifying method according to claim 7 wherein the first signal is a sub-beam addition signal or a radio frequency signal.

9. The optical disc identifying method according to claim 7 wherein the non-blue laser diode is a DVD laser diode or a CD laser diode, and the non-blue-ray disc is a digital versatile disc or a compact disc.

10. The optical disc identifying method according to claim 7 wherein when the lens is moved in the focusing direction, the lens is moved toward or away from the optical disc.

11. The optical disc identifying method according to claim 7 wherein once the optical disc is determined as a non-blue-ray disc, the optical disc identifying method further comprises a step of determining whether the non-blue-ray disc is a digital versatile disc or a compact disc.

* * * * *